United States Patent [19]
Rigdon et al.

[11] 3,906,204
[45] Sept. 16, 1975

[54] SATELLITE POSITIONING APPARATUS

[75] Inventors: James W. Rigdon; Saburo Ifune; LeRoy D. Graber, all of Houston, Tex.

[73] Assignee: Seiscom Delta Inc.

[22] Filed: Apr. 20, 1973

[21] Appl. No.: 352,953

[52] U.S. Cl.... 235/150.27; 340/172.5; 343/100 ST; 343/112 C
[51] Int. Cl. .......................... G06f 15/50; G01s 5/00
[58] Field of Search... 235/150.27, 150.271, 150.26, 235/150.2, 150.24; 343/100 ST, 100 C, DIG. 2; 244/77 SS; 444/1; 340/172.5

[56] References Cited
UNITED STATES PATENTS

| | | |
|---|---|---|
| 3,172,108 | 3/1965 | McClure .................... 343/100 ST |
| 3,191,176 | 6/1965 | Guier ...................... 235/150.271 X |
| 3,242,467 | 3/1966 | Lamy ............................... 340/172.5 |
| 3,471,856 | 10/1969 | Laughlin, Jr. et al. ..... 343/100 ST X |
| 3,680,124 | 7/1972 | Stone et al. ............... 343/100 ST X |
| 3,702,477 | 11/1972 | Brown ............................ 343/112 C |

Primary Examiner—Joseph F. Ruggiero
Attorney, Agent, or Firm—Pravel & Wilson

[57] ABSTRACT

A new and improved apparatus for determining the position of a vehicle or vessel on the earth's surface by processing signals sent from a satellite, based on the doppler shift in frequency of the signals so sent, and the orbit description data encoded in the signals.

10 Claims, 10 Drawing Figures

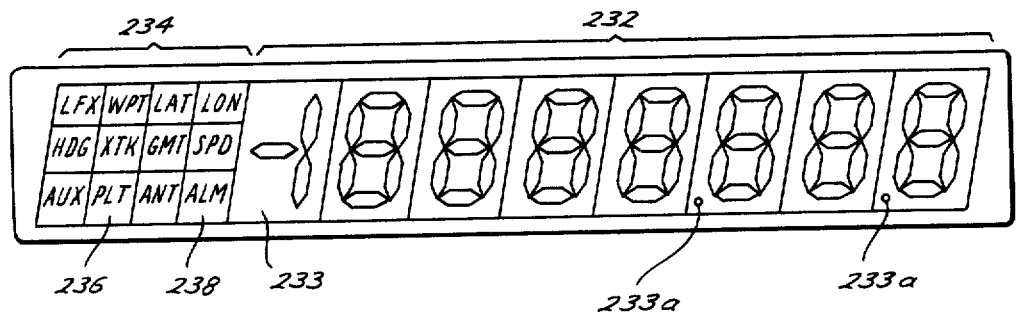
Fig. 3
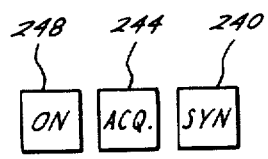 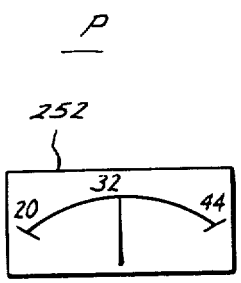 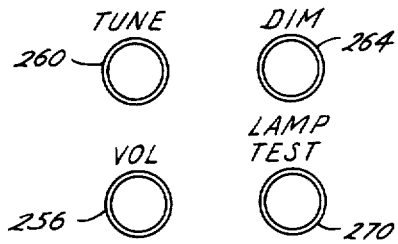
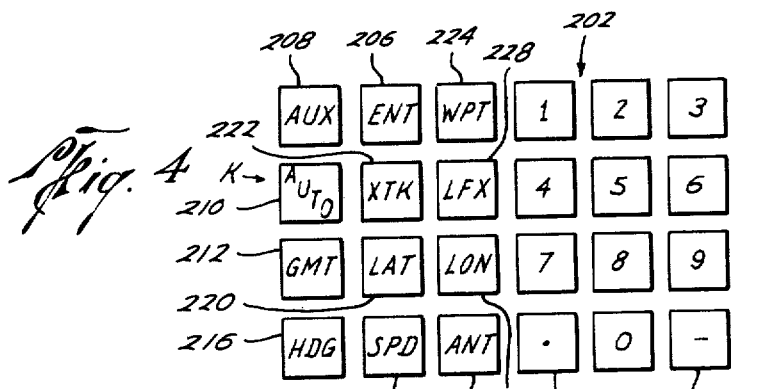
Fig. 4
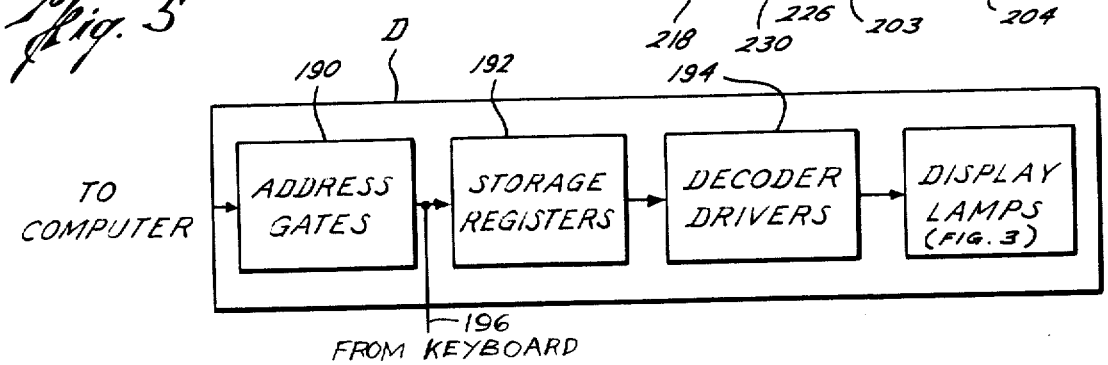
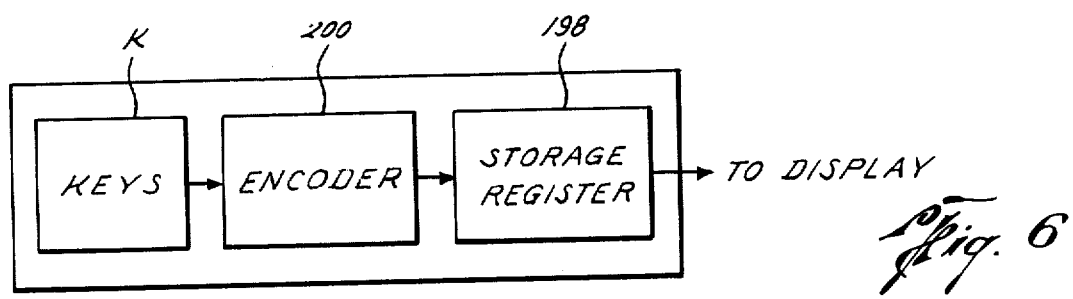
Fig. 6

SATELLITE POSITIONING APPARATUS

BACKGROUND OF THE INVENTION

1. Field of the Invention

The present invention relates to determining the position of vehicles or vessels on the surface of the earth.

2. Description of Prior Art

The United States Navy Navigation Satellite System (NNSS) using multiple orbiting Transit Satellites to send data in the form of doppler shift signals and orbit definition data at repeated time intervals, as disclosed in U.S. Pat. Nos. 3,191,176 and 3,172,208 was made available for commercial use in 1967.

Since this Navy Navigation Satellite System was developed primarily for military use, it was considerably more sophisticated and complex, and thus more expensive, than necessary for commercial purposes, such as navigation of seismic exploration vessels, fishing craft, and other marine transportation vessels. Accordingly, this system and similar systems using similar design techniques have not enjoyed widespread use in non-military navigation systems.

SUMMARY OF INVENTION

Briefly, the present invention provides a new and improved apparatus for determining the position of a vessel or vehicle on the earth from the doppler shift in frequency of the signal sent from a satellite and from the orbit definition or description data sent as the signal from the satellite. The satellite positioning apparatus of the present invention includes a receiver for the signal sent from the satellite which demodulates the frequency of the satellite signal to determine the doppler shift therein and decodes the orbit definition data sent by the satellite signal, a computer for processing the doppler shift and orbit definition data to determine the location and position of the vehicle, an interfere circuit including a doppler counter for providing the doppler shift and orbit definition data to the computer from the receiver, and a display for indicating the location of the vehicle determined by the computer.

The present invention includes several new and improved features permitting a satellite positioning apparatus of reduced complexity and cost. By way of example, doppler shift information, in the form of doppler shift count, and the satellite orbit description data are time division multiplexed in a data multiplexer before being processed in the computer, permitting a small computer to be used on the time-shared basis. Further, since each of the Transit Satellites sends signals at repeated two minute intervals, an interrupt circuit notifies the computer of receipt of a new message so that the computer can call for the new message. A message reject circuit is also provided, which suppresses output of orbit definition data to the computer until the computer requests it, preventing new incoming data from interfering with positioning computations of the computer at undesired times. Additionally, an error detection circuit is provided in order to prevent errors in data received from the satellite from affecting position calculations.

The present invention further provides a new and improved control keyboard for prompt and accurate entry of data and requests therefor into the computer. Additionally, when it is desired to use a double channel satellite positioning apparatus receiving both frequency channels of signals sent from the Transit Satellite, the present apparatus may be readily adapted for such double channel use, without requiring redesign and extensive modification of the existing single channel system.

It is an object of the present invention to provide a new and improved satellite positioning apparatus.

BRIEF DESCRIPTION OF THE DRAWINGS

FIG. 3 is an elevation view of the control panel and display of the apparatus of the present invention;

FIG. 4 is an elevation view of the control keyboard for entry by an operator of data and requests therefor into the apparatus of the present invention;

FIG. 5 is a schematic electrical circuit diagram of the display section of the apparatus of the present invention;

FIG. 6 is a schematic electrical circuit diagram of the control keyboard section of the apparatus of the present invention;

DESCRIPTION OF THE PREFERRED EMBODIMENT

Figure 1:
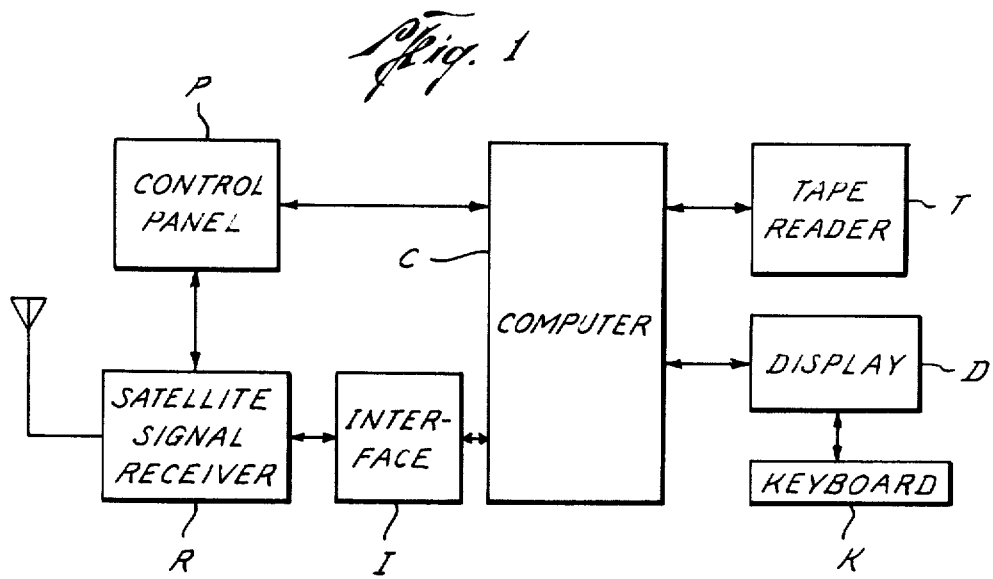
FIG. 1 is a schematic diagram of the apparatus of the present invention.

In the drawings, the letter A designates generally the apparatus of the present invention for processing data, sent from a satellite in the form of a frequency signal containing phase modulated pulse doublets of orbit definition data to determine a position of a vehicle on the earth. It should be understood that the vehicle with which the apparatus A is used may be a marine or waterborn vessel or vehicle, as well as a land vehicle or an aircraft, if desired.

The apparatus A includes a receiver R (FIGS. 1, 7A, 7B and 7C) for receiving the fixed frequency signal containing the phase modulated pulse doublets of orbit definition data sent from the orbiting satellite. The receiver R, in a manner to be set forth below, demodulates the fixed frequency signal to determine the doppler shift in the frequency of the signal sent from the satellite and decodes the phase modulated pulse doublets of orbit definition data in the signal. The receiver R provides the doppler shift in the frequency and the orbit definition data to an interface circuit I (FIGS. 1 and 8) which includes a doppler counter to count the doppler shift in frequency of the signal from the satellite. The interface circuit I provides the doppler shift count and the orbit definition data to a computer C (FIG. 1).

The computer C receives an operation controlling computer program from a tape ready T in order to control the operation of the computer C to process the data received from the interface circuit I and determine the position of the vehicle on the earth.

A display D (FIGS. 1, 3 and 5) receives data from the computer C and forms an output indication of the location of the vehicle determined by the computer C. A control keyboard K (FIGS. 1, 4 and 6) permits an operator of the apparatus A to enter data and requests for data and computations into the computer C through display D. The display D further provides an indication to the operator of the particular data, requests for data or computations requested by the operator using the control keyboard K.

Figure 2:
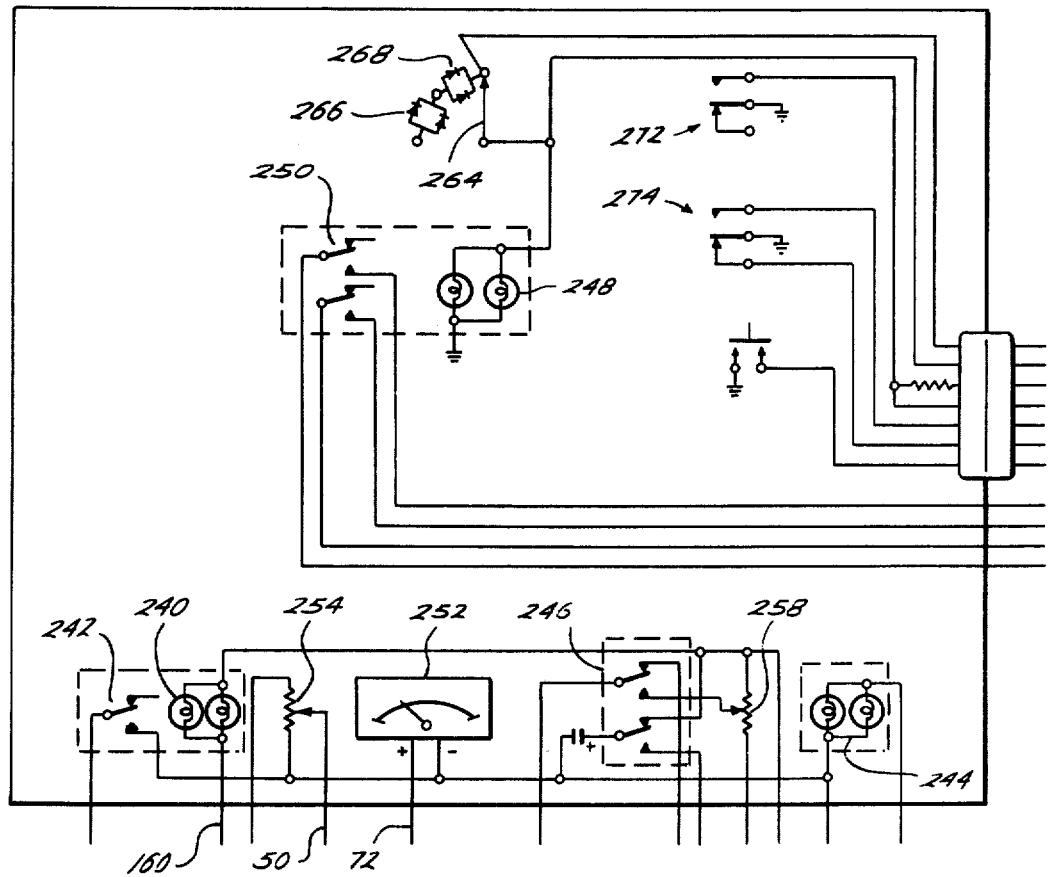
FIG. 2 is a schematic electrical circuit diagram of the control panel of the apparatus of the present invention.

The apparatus A further includes a control panel P (FIGS. 1 – 3) having the display D mounted therein (FIG. 3) and further providing indications of the operational condition of the apparatus A, the doppler frequency shift of the signal, as well as permitting manual control of certain operations of the apparatus A, as will be set forth below.

RECEIVER R

The receiver R of the apparatus A receives the signal from the satellite and determines the doppler shift in the frequency of the signal sent from the satellite as well as decodes the orbit definition data from the phase modulated pulse doublets in the signal sent from the satellite, as has been set forth above. Considering the receiver R more in detail (FIGS. 7A – 7C), a receiving antenna N thereof receives the fixed frequency signal from the satellite and provides such signal to an intermediate frequency circuit F which demodulates the fixed frequency signal received by the antenna N and provides such signal to a phase detector Q which determines the phase of the demodulated signal from the intermediate frequency circuit F. A phase lock loop circuit M receives an output signal from the phase detector Q to regulate the frequency of the intermediate frequency circuit F.

A doppler demodulator X responds to the output of the phase lock loop M to determine the doppler shift in the frequency of the signal sent from the satellite and received by the antenna N. A local oscillator O forms a reference frequency signal for use in receiver circuit R and furnishes this signal to a synthesizer circuit S which forms demodulating frequency signals for the intermediate frequency circuit F, the phase detector Q and the doppler demodulator X. A bit phase detector circuit B receives an output signal from the phase detector Q and determines the phase of the orbit definition data pulse doublets received from the satellite. A bit rate phase lock loop circuit L responds to the output from the bit phase detector B and controls the phase of the orbit definition data pulse doublets.

A data decoder circuit y receives an output signal from the phase detector circuit Q and decodes the orbit definition data from the phase modulated pulse doublets, providing such orbit definition data to the interface circuit I for provision thereby to the computer C.

The receiver R further includes a message synchronization counter Z which detects the synchronization pattern code of one logic 0, twenty-three consecutive logic 1 pulse doublets and a final logic 0 pulse doublet. The synchronization pattern code is well known in the art and the decoding thereof is by conventional digital logic decoding techniques. The message synchronization counter Z detects this synchronization pattern code and indicates receipt of such code to the computer C through the interface circuit I.

The antenna N (FIG. 7A) senses the 400 megahertz fixed frequency signal sent from the orbiting Transit Satellite and provides such signal to a conventional preamplifier 10 tuned to this center frequency, since the actual frequency received depends on the doppler shift due to satellite movement. As is known, it not infrequently occurs that more than one orbiting satellite is within radio range. As will be set forth below, the apparatus A provides the user thereof with a choice of the particular satellite whose signals are to be processed.

The amplifier 10 provides the doppler containing frequency signal received by the antenna N to a first IF stage 12 of the intermediate frequency circuit F. A mixer 14 of the first IF stage receives the satellite signal from the preamplifier 10 and further receives a 360 megahertz demodulating signal over a conductor 16 which is formed in the synthesizer circuit S in a manner to be set forth below.

A filter 18 tuned to 40 megahertz, the difference between the 400 megahertz and the 360 megahertz signals fed to the mixer 14, receives the output of the mixer 14 and provides such output containing the 40 megahertz signal less satellite doppler shift to a gain controlled amplifier 20. The amplifier 20 provides the amplified IF signal to a second IF stage 22 of the intermediate frequency circuit F. A mixer 24 receives the output signal from the amplifier 20 of the first IF stage 12 and further receives a 55 megahertz signal, less doppler shift, from the phase lock loop circuit M over a conductor 26, formed in a manner to be set forth below.

A filter 28 tuned to the fifteen megahertz difference in frequency between the two input signals to the mixer 24 receives the output of the mixer 24 and furnishes such output to a gain controlled amplifier 30 which provides the output signal from the second IF stage 22 of the intermediate frequency circuit F to a first mixer 32 and a second mixer 34 of the phase detector circuit Q.

The first mixer 32 of the phase detector Q further receives a fifteen megahertz demodulating frequency signal from the synthesizer S over a conductor 36. The second mixer 34 of the phase circuit Q receives a 15 megahertz signal, in phase quadrature to the signal present on the conductor 36, as will be set forth below, from the synthesizer S over a conductor 38.

Accordingly, when the input signal to the mixer 32 from the amplifier 30 of the intermediate frequency circuit F is substantially in phase with the signal present on the conductor 36, the mixer 32 provides an output signal over a conductor 40 of measurable amplitude which is furnished to a gain controlled amplifier 42 which provides a signal over conductors 44 and 46 to the gain control input terminals of the gain controlled amplifiers 20 and 30 in order to limit the gain of the two IF stages of the intermediate frequency circuit F.

When the signal from the mixer 32 on the conductor 40 is of measurable amplitude due to the phase alignment of the two inputs to the mixer 32, the mixer 34 forms an output signal of substantially zero DC volts, due to the phase quadrature of the signals on the conductors 36 and 38. The output from the mixer 34 is provided over a conductor 50 to the phase lock loop means M.

Figure 7A:
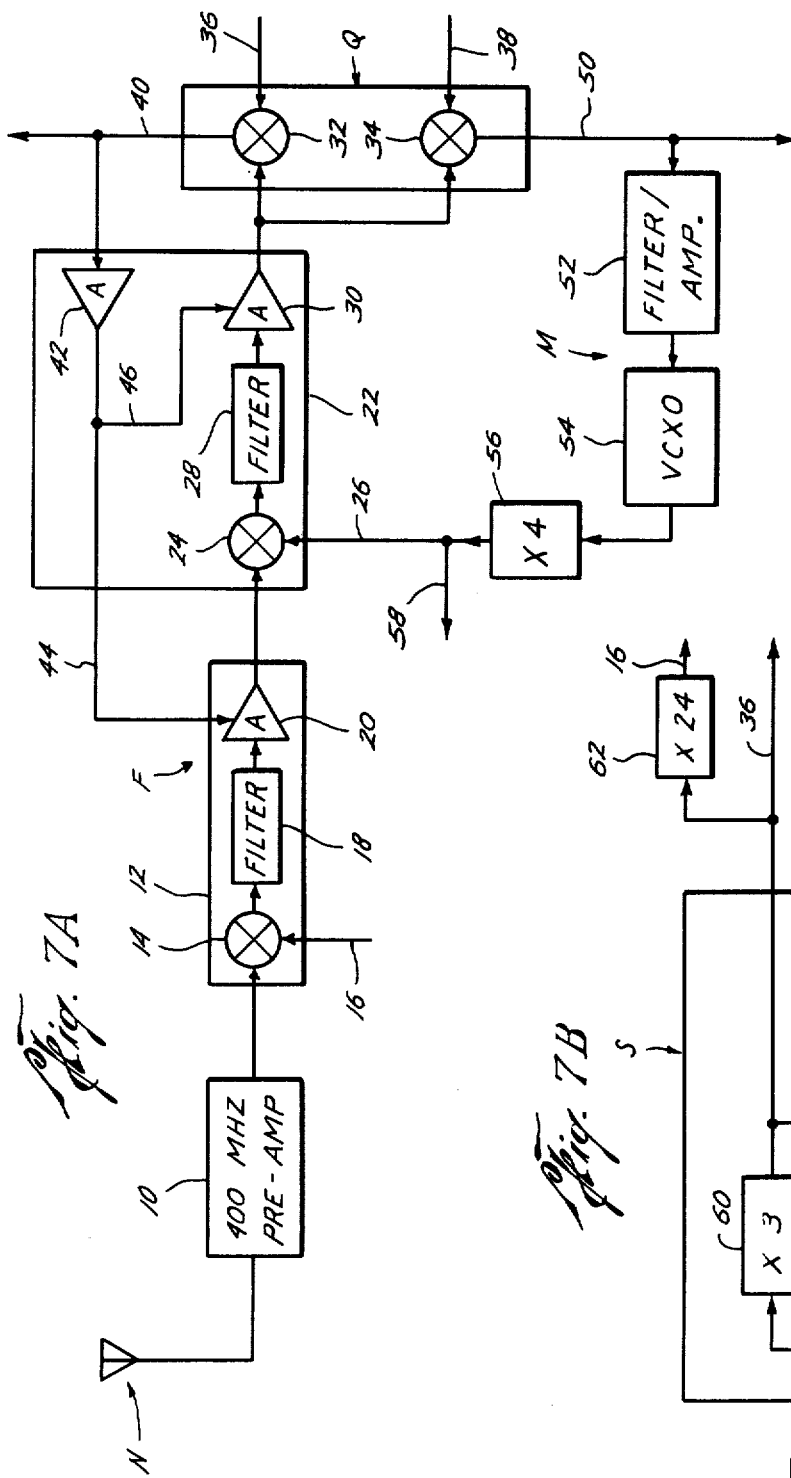
FIGS. 7A, 7B and 7C are schematic electrical circuit diagrams of the receiver section of the apparatus of the present invention.
Figure 7B:
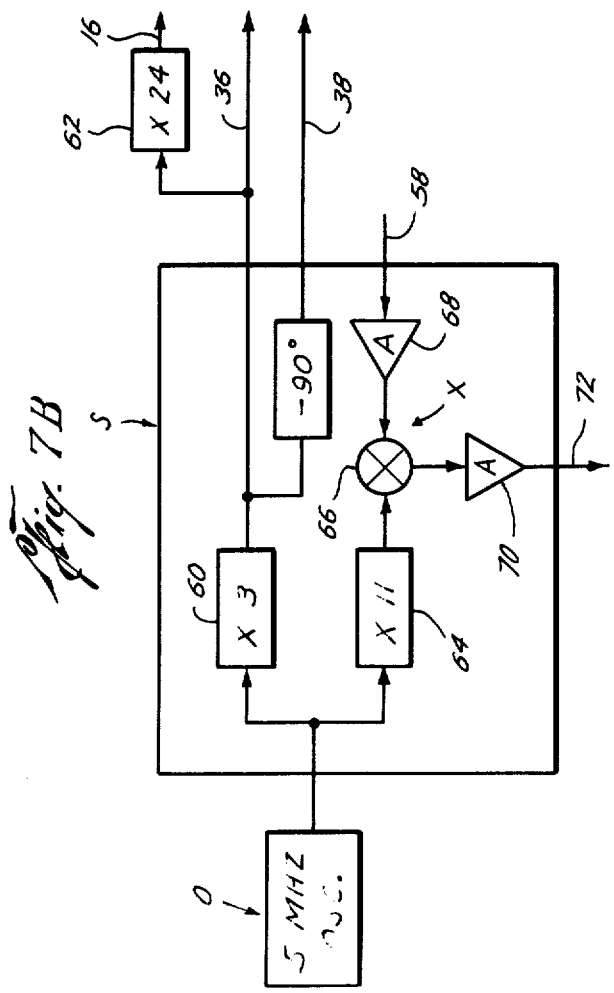
Figure 7C:
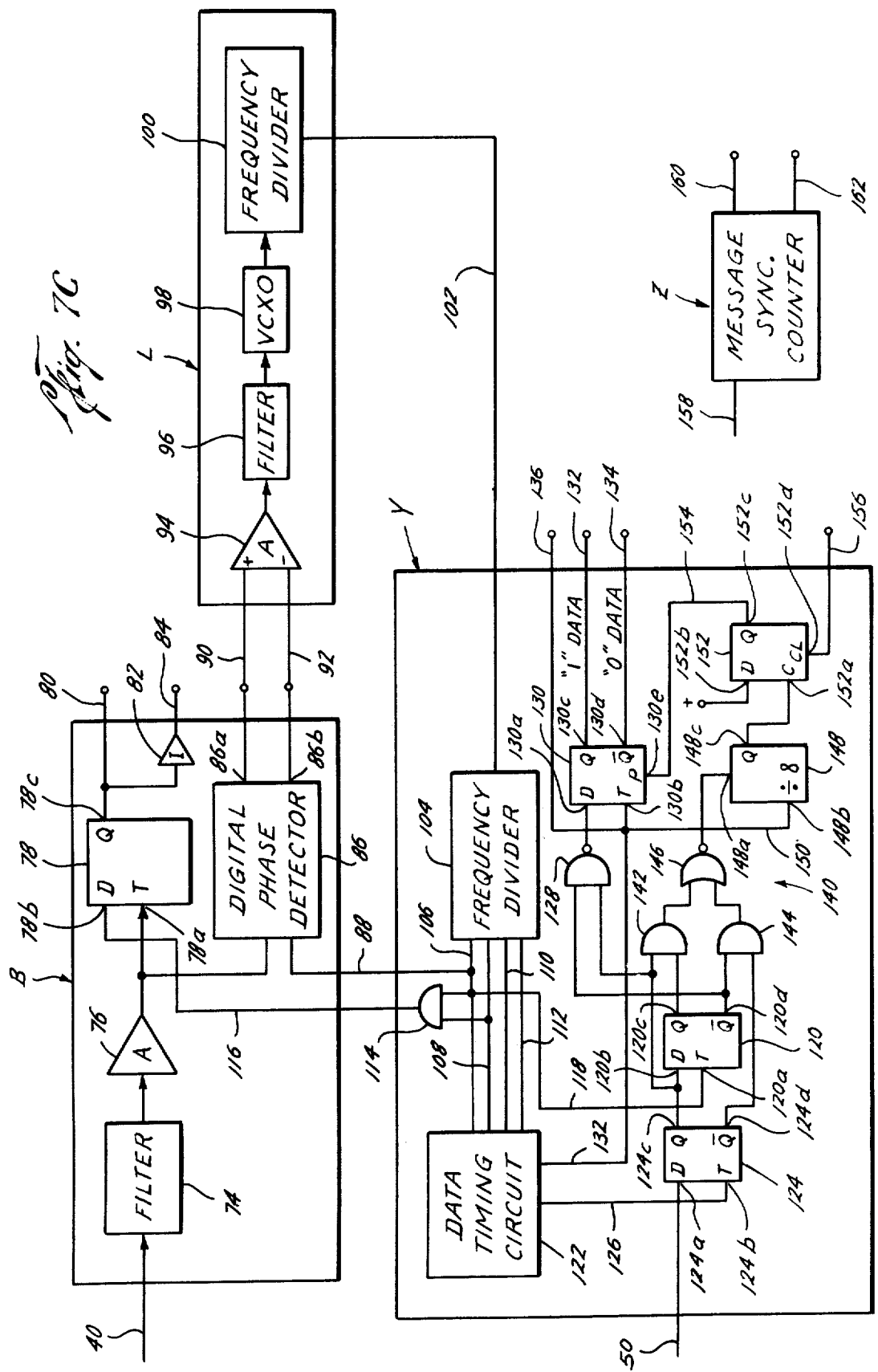

The phase lock loop means M includes a filter/amplifier 52 which receives the output signal from the mixer 34 and forms an output voltage which is furnished to a voltage controlled crystal oscillator (VCXO) 54 in order to control the frequency thereof. The VCXO 54 provides an output signal which varies about a center frequency over a fraction of the normal doppler shift range in accordance with the output voltage from amplifier 52 so that this center frequency when multiplied in frequency by a "TIMES 4" frequency multiplier circuit 56 forms the 55 magahertz signal less doppler shift furnished to the mixer 24 of the intermediate frequency circuit F. A conductor 58 furnishes the output of the phase lock loop circuit M to the doppler demodulator X (FIG. 7B).

The synthesizer S receives a stable frequency signal of 5 megahertz from the local oscillator O and synthesizes a 15 megahertz demodulating frequency in a "TIMES 3" frequency multiplier 60 which is provided, as has been set forth, over the conductors 36 and 38 in phase quadrature to the phase detector Q. A "TIMES 24" frequency multiplier 62 of the synthesizer S further receives the 15 megahertz signal formed in the frequency multiplier 60 and forms therefrom a 360 megahertz demodulating signal which is provided over the conductor 16 to the mixer 14 in the first IF stage 12 of the intermediate frequency circuit F in order to demodulate the incoming 400 megahertz signal from the satellite.

A "TIMES 11" frequency multiplier 64 receives the 5 megahertz output signal from the oscillator 0, forming therefrom a 55 megahertz signal which is fed to a doppler demodulator mixer 66 in the doppler demodulator X. The doppler demodulator mixer 66 further receives the 55 megahertz less doppler shift signal from the phase lock loop M present on the conductor 58, through a buffer amplifier 68.

Figure 8:
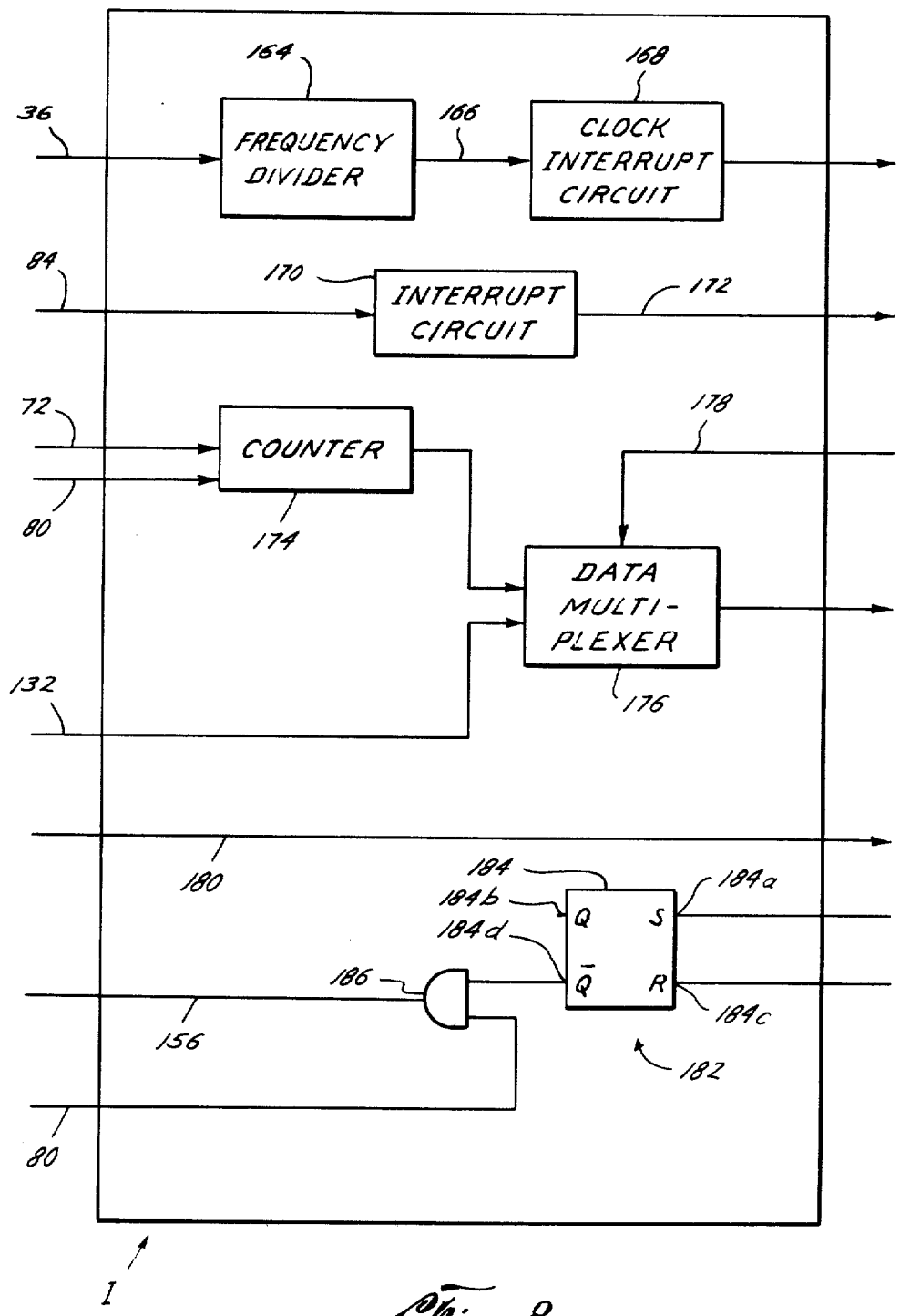
FIG. 8 is a schematic electrical circuit diagram of the interface circuit of the apparatus of the present invention.

The doppler demodulator mixer 66 accordingly receives and responds to the output of the phase lock loop circuit M and the demodulating frequency formed in the multiplier 64 forming an output signal indicating the doppler shift in the frequency of the signal sent from the satellite which is provided through a buffer amplifier 70 over a conductor 72 to the interface circuit 1 (FIG. 8).

The bit phase detector B (FIG. 7) receives at an input active filter 74 the gradually fluctuating output from the mixer 32 present on the conductor 40. The filter 74 passes the 101 hertz train of phase modulated doublets of orbit data definition, which are provided through a buffer amplifier 76 to a D flip-flop 78 at a T, or trigger input, 78a thereof. A D input 78b of the flip-flop 78 receives a comparison signal from the data decoder circuit Y, formed in a manner to be set forth below, so that unless the D input terminal 78b is receiving a logic 1 when activated by at logic 1 at the trigger input 78a, a Q output 78c of the flip-flop 78 remains at a logic 0 level indicating that the data pulse doublets are not in phase.

An output conductor 80 provides this synchronization signal from the bit phase detector B to the interface circuit I, while an inverter 82 provides an inverted version of the signal present on the terminal 80 over an output conductor 84 to the interface circuit I. The frequency of the signal furnished to the trigger input 78a of the flip-flop is substantially equal that present on the D input terminal 78b of the flip-flop 78, since as will be set forth below the signal presented to the terminal 78b is at the 101 hertz data processing rate. Thus, the presence of a logic 1 on the output conductor 80 from the bit phase detector B indicates that the bit phase detector B has determined that the phase of the orbit definition data pulse doublets is in synchronism with the data processing frequency formed in the data decoder Y.

A digital phase detector 86 receives an input signal from the buffer amplifier 76 representing the pulse doublet portion of the signal formed in the mixer 32 and provided to the bit phase detector B over the conductor 40. The digital phase detector 86 further receives an input signal representing the desired phase and frequency of the orbit definition data pulse doublets received from the satellite over a conductor 88 from the data decoder circuit Y. The digital phase detector 86 is a conventional digital phase detector, forming a logic 1 signal at an output terminal 86a and furnishing same over an output conductor 90 to a bit rate phase lock loop circuit L when the input signals to the phase detector 86 are in a first phase relationship, such as the phase of the signal present on the conductor 88 being in a phase leading relation. The phase detector 86 forms a second output signal at an output terminal 86b which is a logic 1 level when the input signals are in an opposite phase relationship, furnishing this signal over a conductor 92 to the bit rate phase lock loop circuit L.

An operational amplifier 94 of the bit rate phase lock loop circuit L receives the input signals present on the conductors 90 and 92 and forms an output signal whose polarity indicates which of the input signals is in a logic 1 level. The output signal from the amplifier 94 is furnished through a filter 96 to a voltage controlled crystal oscillator (VCXO) 98 which forms an output frequency of approximately 1.024 megahertz dependent on the voltage presented thereto by the filter 96 and provides such output frequency signal to a frequency divider 100 which reduces the frequency of the oscillator 98 by a factor of 32, providing this reduced frequency signal over a conductor 102 to the data decoder circuit Y.

Considering the data decoder circuit Y of the receiver R more in detail, a frequency divider circuit 104 receives the 32 kilohertz signal from the frequency divider 100 in the bit phase lock loop circuit L and forms therefrom requisite frequency signals by frequency division in conventional digital logic circuits to form a one-hundred one output signal over an output conductor 106, an 800 hertz output signal over an output conductor 108, a 200 hertz output over an output conductor 110 and a 400 hertz output signal over an output conductor 112. The 100 on hertz signal present on the conductor 106 and the 800 hertz signal present on the conductor 108 are combined in an AND gate 114 and provided over a conductor 116 to the D input 78b in the bit phase detector circuit B, to detect synchronization of the pulse doublets, as has been set forth. Also, as has been set forth, the 101 hertz signal present on the conductor 106 is provided over the conductor 88 to the digital phase detector 86 in the bit phase detector circuit B.

A data timing circuit 122 of the data decode circuit Y receives the 101 hertz signal on the conductor 106, the 800 hertz signal on the conductor 108, the 200 hertz signal on the conductor 110 and the 400 hertz signal on the conductor 112. The circuit 122 combines these pulses in conventional gates to form a data read-in or strobe pulse on a conductor 126 in synchronism with the incoming phase doublets present on the conductor 50 provided to a D input 124a of a data read-in flip-flop 124 in the data decode circuit Y. The timing or strobe pulse formed in the data timing circuit 122 is provided over the conductor 126 to a T input 124b of the flip-flop 124. The circuit 122 further divides the 101 hertz frequency pulses received by a factor of two in a conventional frequency divider to form a 50 hertz bit sync or data rate signal on an output conductor 132.

Accordingly, the flip-flop 124 presents the logic state of the incoming phase doublets received at Q and $\overline{Q}$ output terminals 124c and 124d, respectively, thereof in response to the clock pulse on the conductor 126. The signal present at the Q output 124c of the flip-flop 124 is read into the flip-flop 120 at a D input terminal 120b thereof by the clock pulse provided to the input terminal 120a over the conductor 118 in the manner set forth above. Thus, when a logic 1 is present at the output terminal 124c during a preceding clock cycle of the signal present on the conductor 118, a Q output terminal 120c of the flip-flop 120 assumes a logic 1 state. Conversely, when a logic 0 signal is present at the terminal 124c, a $\overline{Q}$ output terminal 120d of the flip-flop 120 is driven to a logic 1 level during the next clock cycle.

As is known, the satellite orbit definition data signals are in the form of phase modulated pulse doublets composed of two half-bits transmitted twice at a bit rate of 50 cycles per second, with the second half-bit being transmitted being in reverse polarity to the first half-bit. The phase of the doppler signal is advanced and then retarded to represent binary 1 during a half-bit and retarded and then advanced for the reverse polarity. Conversely, the phase of the doppler signal is retarded and then advanced to represent binary 0 during the first half-bit and advanced and then retarded during the second half-bit.

A decoding NAND gate 128 is connected to receive the output of the $\overline{Q}$ terminal 120d of the flip-flop 120 and the Q terminal 124c of the flip-flop 124, so that the presence of an advanced phase during the first half-bit of the phase modulated pulse doublet, recognized and decoded in the flip-flop 120 as a logic 1 at the Q output terminal 120c and a logic 0 at the $\overline{Q}$ output terminal 120d, and a retarded phase during the second half-bit, interpreted by the flip-flop 124 as a logic 0 at the output terminal 124c, is decoded by the NAND gate 128 to be a logic 1 level at the output terminal of such gate. This logic 1 output is transferred to a D input terminal 130a of a flip-flop 130 by the 50 hertz bit sync signal formed in the data timing circuit and provided to a trigger input 130b of the flip-flop 130 over the conductor 132. The frequency of the bit sync signal present on the conductor 132 is one-half that of the occurrence of the doublets in the half-bits at 101 hertz of the orbit data definition signal.

A Q output terminal 130c of the flip-flop 130 presents a logic 1 output signal whenever the data content of the orbit data definition as encoded in the phase modulated doublets and decoded by the decoding gate 128 indicate such data to be a logic 1. Conversely, a $\overline{Q}$ output terminal 130d of the flip-flop 130 presents a logic 1 output signal when the decoding gate 128 and decoding flip-flops 124 and 120 determine the data content of the doublet currently being decoded to be a logic 0. An output conductor 132 provides the data from the output terminal 130c to the interface circuit I, while an output conductor 134 provides the output from the terminal 130d to the interface circuit I.

An output conductor 136 provides the 50 hertz bit synchronization signal to the interface circuit I.

As has been set forth, the two half-bits in each bit of data sent from the satellites are opposite in polarity from each other. Accordingly, consecutive appearance of like polarities, interpreted by the decoding flip-flops 124 and 120 to be either consecutive logic 1 or consecutive logic 0, are erroneous data, and a data error detection circuit 140 detects such erroneous data and prevents such data from being furnished to the interface circuit I.

A first AND gate 142 is connected to the Q terminals 120c and 124c and senses the consecutive occurrence of two "high" half-bits in the data, forming a logic 1 signal to indicate same. A second AND gate 144 is connected to the $\overline{Q}$ output terminals 120d and 124d, forming a logic 1 output signal in response to the presence of two consecutive "lows" in half-bits of the orbit definition data.

Presence of a logic 1 at the output of either of the AND gates 142 and 144 drives the output of a NOR gate 146 to a logic 0 level which is furnished to a digital counter 148 at a clear input terminal 148a thereof. The digital counter 148 receives the data rate signals from the conductor 132 at a clock input terminal 148b over an input conductor 150. The counter 148 counts a predetermined number of valid data cycles before permitting such data to be transmitted to the interface I and therefrom to the computer C.

As has been set forth, the error detection circuit 140 furnishes a logic 0 signal to the clear input terminal 148a of the counter 148. Presence of this logic 0 lever drives a Q output terminal 148c of the counter 148 to logic 0, preventing the counter 148 from counting so long as the error detection circuit 140 is receiving and detecting errors in the data bits from the satellite.

Conversely, when valid data, as verified by the error detection circuit 140, are present the counter 148, after eight data bit intervals, causes the output terminal 148c to go to a logic 1 level, energizing a clock input terminal 152a of a message reject flip-flop 152. A D input terminal 152b of the flip-flop 152 is connected to a positive or logic 1 signal level so that receipt of a positive going signal at the clock input terminal 152a drives a Q output terminal 152c of the flip-flop 152 to a logic 1 level.

A conductor 154 electrically connects the Q output terminal 152c of the flip-flop 152 to a preset control terminal 130e of the flip-flop 130. The preset control terminal 130e of the flip-flop 130 does not respond to this logic 1 level, permitting such flip-flop to pass data to the computer C.

The present control terminal 130e of the flip-flop 130 responds to a logic 0 at the output terminal thereof and sets the Q output terminal 130c of the flip-flop 130 to logic 1 and the $\overline{Q}$ output terminal 130b of the flip-flop 130 to logic 0, maintaining such output terminals in such logic states regardless of the presence of input data for the duration of the logic 0 at the preset input terminal 130e.

In this manner, receipt of a message reject signal, formed in the interface circuit I in a manner to be set forth below, by the flip-flop 152 at a clear input terminal 152d thereof from an input conductor 156 causes the Q output terminal of the flip-flop 152 to be driven to a logic 0 state, suppressing output signals from the data decoder circuit Y in response to a message reject signal from the interface circuit I and the computer C.

As has been set forth, the message sync counter Z of the receiver circuit R responds to the alert codes sent by the satellite in the form of a logic 0, followed by 23 logic 1 signals and a subsequent logic 0, presented thereto over an input conductor 158 from the data decoder Y. The message sync counter Z indicates receipt of the alert code over output conductors 160 and 162 to the control panel P and to the interface circuit I, respectively.

INTERFACE CIRCUIT

The interface circuit I provides an interconnection between the receiver R and the computer C, as has been set forth, permitting the computer to process the doppler shift and orbit definition data to determine the location of the vehicle on the earth. Considering the interface circuit I more in detail, a frequency divider 164 receives the local reference signal from the oscillator O over the conductor 36. The frequency divider 64 is a conventional digital logic frequency divider dividing the 5 megahertz logic reference signal down to a 10 cycles per second rate which is furnished over a conductor 166 to a clock interrupt circuit 168. The clock interrupt circuit 168 forms an output pulse when energized every 100 milliseconds by the frequency divider 164 over the conductor 166, thereby providing a local reference frequency for the internal clock within the computer C, which is repetitively called for at this time interval from the circuit 168 by the computer C, so long as the computer C is operating satisfactorily.

An interrupt circuit 170 responds to the output of the bit rate signal inverted in the inverter 82 of the bit phase detector B (FIG. 7C) and furnished over the conductor 84 to energize the interrupt circuit 170, causing same to form a pulse provided over a conductor 172 to the computer C indicating that the orbit definition data bits in the satellite signal are synchronized and ready for processing by the computer C. A doppler counter 174 receives the doppler frequency signal from the conductor 72 and counts the number of pulses in such doppler frequency which occur during the time interval between successive pulses from the bit phase detector B furnished over the conductor 80. Since the doppler counter 174 accordingly must count only for the duration of time between the 50 hertz pulses present on the conductor 80, a much smaller doppler counter is required, permitting simplification and reduction of the complexity of the doppler counter as contrasted to the prior art counters requiring large capacity counters with overflow capacity due to the long time duration between read-outs.

A data multiplexer 176 receives the output from the doppler counter 174 as well as the decoded data from the data decoder Y. The data multiplexer 176 is a conventional time division multiplexer which responds to a control signal over a conductor 178 from the computer C in response to the signal furnished by the interface circuit over the conductor 172, causing the data multiplexer 176 to multiplex the decoded orbit description data and doppler count from the doppler counter 174 for processing by the computer C. A conductor 180 in the interface circuit I transmits to the computer C the output of the bit phase detector B present on the conductor 162, indicating that the bits being received are in synchronism and that processing of the data can continue. A message reject circuit 182 of the interface circuit I includes an R-S flip-flop 184 responding to a start signal from the computer C at an S input 184a thereof to drive a Q output terminal 184b to a logic 1 level. Conversely, the flip-flop 184 responds to a stop signal at an R input terminal 184c, driving a Q̄ output terminal 184d to a logic 1 level and energizing a first input of an AND gate 186. A second input of the AND gate 186 is electrically connected to the conductor 80 so that when the bit phase detector B indicates with a logic 1 output signal on such conductor that the received satellite signals are in synchronism with the local bits in the bit phase lock loop L, a condition which would normally cause the computer C to accept the data regardless of the current process being performed, the computer C is provided with an alternative. The computer C can if the program controlling same so determines, override and ignore the notification that incoming data is awaiting processing, permitting the computer C to continue with the present operation by providing a stop signal to the flip-flop 184, driving the output of the AND gate 186 to the logic 0 level which is provided over the conductor 156 to the message reject flip-flop 152 which, as has been set forth above, suppresses output signals from the data decoder Y in response to the message reject signal from the message reject circuit 182 in response to the computer C.

COMPUTER

The computer C of the present invention may be any conventional general purpose digital data processing machine such as, in the preferred embodiment, a "NOVA 1200" computer sold by Data General Corporation of Southboro, Mass. Suitable methods for controlling the operation of the computer C to determine the position of the vehicle on the earth are conventional and known in the art and are set forth, for example in U.S. Pat. Nos. 3,172,108 and 3,191,176 and in a document entitled "Technical Memorandum-Program Requirements for 2 Minute Integrated Doppler Satellite Navigation Solution" edited by J. B. Moffett and identified as document No. TG 819-1(Rev.), published in Sept., 1971, by the Johns Hopkins University Applied Physics Laboratory in Silver Spring, Md.

A suitable tape reader for performing the function of the tape reader T of reading-in the program controlling operation of the computer C is a Chalco highspeed paper tape photo reader, for example.

CONTROL PANEL, DISPLAY AND CONTROL KEYBOARD

Considering the display D in detail, (FIG. 5) a group of address gates 190 respond to signals from the computer C transferring information between the computer C and a plurality of storage registers 192. The information stored in the storage registers 192 is provided to a plurality of decoder drivers 194 which provide output signals to drive the display lamps (FIG. 3) mounted on the display panel P. The address gates 190 further receive, in addition to the signals energizing the storage registers 192, signals from a conductor 196 to receive information from a set of storage registers 198 in the control keyboard K (FIG. 6). The storage registers 198 receive and store information in the form of requests provided by a set of encoders 200 which respond to operation of the keys on the control keyboard K (FIGS. 4 and 6).

Considering the control keyboard K more in detail, this keyboard is mounted with the control panel P behind a folding door so that the control keyboard K may be moved inwardly and enclosed within the control panel P preventing inadvertent operation of one of the control keys which could interfere with or destroy the successful processing of the data by the computer C uring that cycle. The control keyboard includes twenty-four keys, ten of which, as indicated by reference numeral 202 are assigned to the ten Arabic numerals 1, 2, 3, 4, 5, 6, 7, 8, 9 and 0. A key 203 is assigned to a decimal point and permits the operator of the apparatus A to insert a decimal point in the proper place in the data he desires to enter into the computer. A key 204 is assigned to an algebraic minus sign, permitting the user of the apparatus A to enter negative data when it is desirable or necessary to do so. A control key 206 labeled ENT, controls the keyboard K and notifies the computer C through the circuit of the display D (FIG. 5) that the user of the apparatus A desires to enter data into the computer C and permits the computer C to respond and accept such data in the form of numerical information entered by means of the numerical keys 202. The remaining control keys on the control keyboard K permit the user of the apparatus A to enter and/or display certain of the control functions being processed by the computer C.

An AUX key 208 allows for special function entry into the computer C and/or display by the display means D by depressing the key 208 for auxiliary, plus a secondary control key of the type set forth below, permitting entry of secondary data and/or information and display thereof.

An AUTO key 210 causes the computer C to perform automatic, sequential display on the display D of latitude, longitude and Greenwich Mean Time, each of the three parameters being displayed for consecutive 6 second intervals. An GMT key 212 allows for entry into the computer C and/or display on the display D of Greenwich Mean Time. An HDG key 214 allows for entry into the computer C and/or display on the display D of the heading of the user's vehicle. An SPD key 218 allows for entry into the computer C and/or display on the display D of the speed or velocity of the user's vehicle.

An LAT key 220 allows for entry into the computer C and/or display on the display D of the latitude of the user's vehicle.

An XTK key 222 allows for display on the display D of the cross-track distance relative to either a previously defined Great Circle or rhumb line course.

An WPT key 224 allows the operator of the apparatus A to enter the latitude and longitude of a waypoint towards which the vehicle of the user is to steer. The WPT key 224 must be used in conjunction with the LAT key 220 to enter latitude and in conjunction with a LON key 226 to enter longitude. The LON key 226 allows for entry into the computer C and/or display on the display D of the longitude of the user's vehicle.

An LFX key 228 allows the operator of the apparatus A to request the computer C to display on the display D sequentially the latitude, longitude and GMT or Greenwich Mean Time of the last satellite position fix performed by the computer C.

An ANT key 230 allows the operator of the apparatus A to enter into the computer C and/or display on the display D of the height of the satellite signal receiving antenna N above or below the reference geoid.

The display lamps of the display D mounted on the display panel P (FIG. 3) contain eight data windows 232. A first data window 233 is used only for certain data displays and can indicate 1, −1 or − as controlled by the computer C. The remaining data display windows 232 can indicate any Arabic numeral requested or computed, with provision for illuminated decimal points at certain windows indicated at 233a.

The panel p also contains twelve function display windows 234. Those function display windows 234 bearing like code indicators on their face to the code indicators on the keyboard K indicate that such key has been depressed and a request for entry or display of such data has been made by the user and that such data is being displayed in the data windows 232. A plot function indicator window 236 is provided to indicated, should it be desirable to use the computer C in conjunction with the plotter, that a request has been made by the plotter to be initialized by data in the computer C. Such data requested by the plotter would be also displayed on the display D.

An alarm indicator lamp 238 of the function display windows 234 when flashing periodically indicates that there has been a power failure in the power supply to the computer C, but that the computer C has subsequently received power and started operations once more and that accordingly the data in the computer C, such as the Greenwich Mean Time, may no longer be valid, alerting the operator to request a display of this data and so determine. The alarm indicator window 238 is additionally continuously energized in the case that the computer C has not requested the clock interrupt circuit 168 of the interface circuit I to provide the one hundred millisecond clock pulse for four consecutive clock pulse intervals. This circuitry is conventional and could include a resettable "TIMES 4" counter which is reset at each request for a clock pulse from the computer C but which energizes the alarm lamp 238 in case a count of four is reached. Failure of the computer C to request a clock pulse for this 400 millisecond interval would indicate that the computer C is locked in a sub-routine and a program failure has occurred, alerting the operator of the apparatus A.

Considering now the remainder of the control panel P (FIGS. 2 and 3), a synchronization indicator light 240 on the control panel P is energized by the message synchronization counter Z in the receiver circuit R over the conductor 160 when the synchronization code is received from the satellite. The indicator lamp 240 is manually depressible as indicated by the switch 242 permitting a manual override and rejection of any incoming message which the user does not wish to process. An acquisition indicator light 244 is energized by a suitable switch, such as a transistor or relay upon receipt of the indication of a phase lock from the output terminal 40 connected to the indicator 32 and the phase lock loop. Energization of the acquisition indicator light 244 indicates that the output frequency signal from the satellite and the local reference frequency signal have been synchronized in the phase lock loop M. The acquisition indicator lamp 244 is further manually depressible in order to reject acquisition of a satellite signal manually, should the operator decide to do so.

An ON indicator lamp 248 is energized and indicates on the panel P that the apparatus A, as indicated by a switch 250, has been connected to a suitable alternating current power supply to energize the apparatus A.

A frequency meter 252 is electrically connected to the conductor 72 to provide an indication of the doppler frequency output from the doppler demodulator X (FIG. 7B). The indicia on the face of the meter 252 are to indicate kilohertz, since the normal range of the doppler frequency of an orbiting satellite is in the range of from 20 kilohertz to 44 kilohertz, as is known.

Additionally, it is sometimes desirable that an aural indication of the absence of phase lock be provided. In this situation, a loudspeaker or other suitable electric to audible transducer is provided and electrically connected to the conductor 50 which provides a relatively low or zero output when phase lock is obtained, and noise at other times. In these situations, it is sometimes desirable for a volume control to be introduced in the circuit of the speaker to reduce noise distraction. In these embodiments, a volume control potentiometer 254 is electrically connected to the conductor 50 between the output of the phase detector Q and the speaker, permitting the operator of the apparatus A to vary the signal level out of the speaker by adjusting a knob 256 on the display panel P.

It is also preferable that an autosweep circuit be included in the receiver R to cause the receiver R to scan the frequency spectrum of the incoming satellite signal in the event no satellite signal has been acquired. In certain situations, it may be desirable to disregard the signal from a satellite recently acquired and tune for a second satellite signal of greater interest. In these situations, the acquisition button 246 is depressed by the user, causing rejection of the signal acquired, and electrically connecting a tuning potentiometer 258 to the receiver R permitting manual sweep of the frequency spectrum expected for the desired incoming signal. A control knob 260 on the panel permits the user of the apparatus A to perform this tuning operation.

A light dimming circuit 262 with the control panel P (FIG. 2) responds to movement of a control knob 264 on the control panel P and electrically connects a diode bridge 266 of parallel connected diodes and a serially connected diode bridge of parallel connected diodes 268 into the energizing circuit of the lamps of the apparatus A in response to movement of the control knob 264. Movement of the control knob 264 accordingly selectively varies the illumination intensity of the lamps allowing the user of the apparatus A to dim these lamps when he desires to do so.

A lamp test push button 270 (FIGS. 2 and 3), permits the user of the apparatus A to press the button 270 and determine whether the seveen complete integer data display lamps 232 on the display panel P are operable. If such lamps are operable, depression of the button 270 causes the display lamps to indicate their operability by forming a display of the integer 8. Depression of the lamp test button 270 further permits the operator of the apparatus A to control the alarm light 238 in the display panel P. If the alarm light 238 is flashing, indicating a power failure in the manner set forth above, depression of the push button 270 turns this light off. However, in the event that the alarm light 238 is not blinking but continuously energized, a program failure of the type set forth above is indicated and the program must be reloaded into the computer C from the tape reader T.

The control panel P (FIG. 2) further includes two control switches, one a stop switch 272 permitting the user of the apparatus A to cause an emergency stop of the computer C should it become necessary to do so. A load switch 274 causes the computer C to request the tape reader T to begin to read in the program controlling the operation of the computer C from the tape so that operations of the apparatus A may begin.

OPERATION OF INVENTION

In the operation of the apparatus A, the receiver R responds to the signal sent from the satellite in the form of a fixed frequency signal containing the phase modulated pulse doublets of orbit definition data and the intermediate frequency circuit F demodulates the fixed frequency signal for processing and furnishes the demodulated signal to the phase detector Q to determine the phase of the demodulated signal from the intermediate frequency circuit F. The phase lock loop means M receives an output of the phase detector Q and regulates the frequency of the intermediate frequency circuit F. The local oscillator O forms a reference frequency signal which is furnished to the synthesizer S in order to form demodulating frequency signals for the intermediate frequency circuit F, the phase detector Q, and the doppler demodulator X, which responds to an output from the phase loop means M and the demodulating frequency signal from the synthesizer S to determine the doppler shift in the frequency of the signal sent from the satellite. The doppler shift in the frequency due to the movement of the satellite with respect to the vehicle with which the apparatus A is mounted may be monitored on the frequency meter 252 of the display panel P.

The bit phase detector B determines the phase of the orbit definition data pulse doublets and provides an output signal to the bit rate phase lock loop means L in order to control the phase of the orbit definition data pulse doublets. The orbit definition data from the phase modulated pulse doublets is decoded in the data decoder Y and provided, along with the doppler shift, to the computer C which processes such data in order to determine the location of the vehicle.

The interface circuit I provides the doppler shift and orbit definition data to the computer, having counted the doppler shift in the doppler counter 174 therein before finishing such signals to the computer C.

After processing, the display means D can then indicate the location of the vehicle determined by the computer C so that the user of the apparatus A may precisely and accurately locate himself and the vehicle with which the apparatus A is mounted on the earth.

Although the apparatus A has been set forth in the preferred embodiment as used in conjunction with the Transit Satellite, it should be understood that the apparatus A is suitable for use with other types of satellites sending doppler shift and orbit definition data, as well. Also, when it is desirable for ionospheric refraction correction purposes to receive the 150 megahertz signal sent by the Transit Satellite, the apparatus A can be readily adapted for such purposes by addition of another receiver R having an IF section F tuned to the requisite frequencies for 150 megahertz reception, and addition of a second interface circuit I having a doppler counter circuit 174 therein to provide a doppler count of the second frequency channel sent by the satellite.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

We claim:

1. An apparatus for processing data, sent from a satellite in the form of a fixed frequency signal containing phase modulated pulse doublets or orbit definition data, to determine a position of a vehicle on the earth, comprising:

a. receiver means for receiving the signal from the satellite, said receiver means comprising:
1. intermediate frequency means for demodulating the fixed frequency signal for processing;
2. phase detector means for determining the phase of the demodulated signal from said intermediate frequency means;
3. phase lock loop means receiving an output of said phase detector means for regulating the frequency of said intermediate frequency means;
4. doppler demodulator means responsive to an output of said phase lock loop means for determining the doppler shift in frequency of the signal sent from the satellite;
5. local oscillator means for forming a reference frequency signal;
6. synthesizer means for forming demodulating frequency signals for said intermediate frequency means, said phase detector means, and said doppler demodulator means from said reference frequency signal;
7. bit phase detector means for determining the phase of the orbit definition data phase doublets;
8. bit rate phase lock loop means for controlling the phase of the orbit definition data pulse doublets; and
9. data decoder means for decoding the orbit definition data from the phase modulated pulse doublets;

b. computer means for processing the doppler shift and orbit definition data to determine the location of the vehicle;

c. interface circuit means for providing the doppler shift and orbit definition data to said computer means, said interface circuit means including doppler counter means for counting the doppler shift; and d. display means for indicating the location of the vehicle determined by said computer means.

2. The structure of claim 1, wherein the satellite transmits a synchronization pattern code before sending the orbit data definition bits, and wherein said receiver means further comprises:
message synchronization counter means for detecting the synchronization pattern code and indicating receipt of same.

3. The structure of claim 1, further including:
tape reader means for reading an operation controlling program into said computer means.

4. The structure of claim 1, wherein said receiver means further includes:
gain control means for limiting the gain of said intermediate frequency means.

5. The structure of claim 1, wherein said interface circuit means further includes:
data multiplexer means for multiplexing the decoded orbit description data and the doppler count from said doppler counter means for processing by said computer means.

6. The structure of claim 1, wherein the satellite sends messages of orbit definition data at repeated time intervals, and wherein said interface circuit means includes:
interrupt means for notifying said computer means of receipt of a new message of orbit definition data.

7. The structure of claim 6, wherein said interface circuit means comprises:
message reject means for suppressing output signals from said data decoder means in response to a message reject signal from said computer means.

8. The structure of claim 1, wherein said receiver means includes:
error detection means for detecting errors in the data received from the satellite.

9. The structure of claim 8, wherein said receiver means includes:
counter means for counting a predetermined number of valid data before transmitting such data to said computer means.

10. The structure of claim 1, further including:
means for entry of data and requests therefor into said computer means.

* * * * *